Nov. 2, 1937. L. H. BAILEY 2,098,024
VACUUM DRIER WITH CENTRIFUGAL DUST SEPARATOR
Original Filed April 8, 1935  2 Sheets—Sheet 2

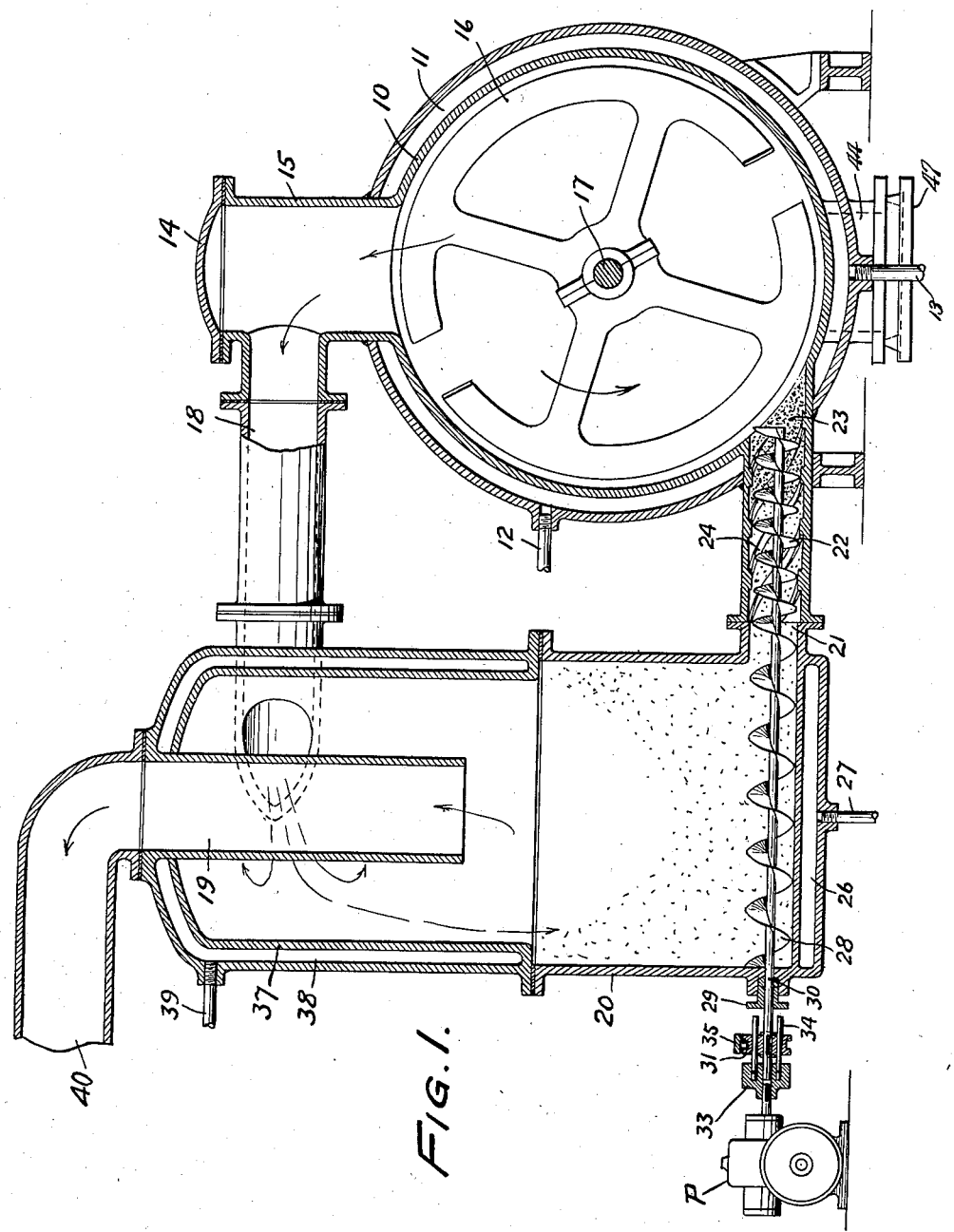

INVENTOR
Lawrence H. Bailey
BY
Augustus C. Staughton
ATTORNEY.

WITNESS:

Patented Nov. 2, 1937

2,098,024

UNITED STATES PATENT OFFICE 2,098,024

VACUUM DRIER WITH CENTRIFUGAL DUST SEPARATOR

Lawrence H. Bailey, Philadelphia, Pa., assignor to F. J. Stokes Machine Company, Philadelphia, Pa., a corporation of Pennsylvania Application April 8, 1935, Serial No. 15,164
Renewed September 28, 1937

7 Claims. (Cl. 34—7)

This invention pertains to new and useful improvements in vacuum driers, and particularly to the dust-separating means of rotary vacuum driers used for drying pulverulent or powdered material, such as starch, whiting, reclaimed rubber, shellac, crystals, etc.

The principal object of the present invention is to provide a new method and more efficient and economical means for trapping or separating the greater part of the dust particles carried out of the drying chamber by the vapors; collecting the particles at a strategic point; and returning them, as collected, continuously into the drying chamber without breaking or lowering the vacuum within the chamber.

In vacuum drying, extremely high vapor velocities are obtained on account of the enormous volume of the steam or other vapors under vacuum. The high speed vapors tend to carry dust particles out of the drying chamber, especially when the material is light or finely divided. This condition is aggravated by the action of the agitating paddles or by the tumbling of the material. In some cases, as much as 20% of the material passes out or over into the dust-collecting means with the vapors.

Heretofore all of this dust was collected in the bag filter and/or the wet-scrubber. As a considerable portion of the dust arises while the drying is still incomplete, the material collected in the filter-bag must be put back into the drier at some subsequent drying operation to complete the drying. The filter-bags have the further disadvantage of causing a serious drop in the vacuum, thus limiting the height of the vacuum obtainable within the drying chamber. Considerable time and labor is also required in attending to the changing and emptying of the filter-bags.

When a wet-scrubber is used, the dust collected in this, of course, requires even more re-working than that collected in the filter-bags.

The above-recited difficulties are wholly or partly eliminated through this invention, which introduces a centrifugal type of dust-trap and collector of a new and novel design producing very desirable economies in the process of vacuum drying.

I have found that the centrifugal dust-trap and collector, for certain heavy materials, such as crystals, may be used as the only means needed between the condenser and the drying chamber to produce the required separation. In other cases, for example, very light and finely divided materials, such as corn starch, may be used in connection with the filter-bag and/or the wet-scrubber, but even with this arrangement it provides the principal means of separating the greater part of the dust and, therefore, decreases the amount of work connected with the bag-filter and/or the wet-scrubber and thus aids in producing greatly increased production.

In connection with the description, I have illustrated in the drawings one embodiment of my invention, chosen from several similar ones, so as to set forth the principles of the new methods and the apparatus which may be used to produce the new results. At the end of the specification, the novel features of my invention will be specifically pointed out and claimed.

In the drawings:

Fig. 1 is a vertical cross-section.

Figure 3:
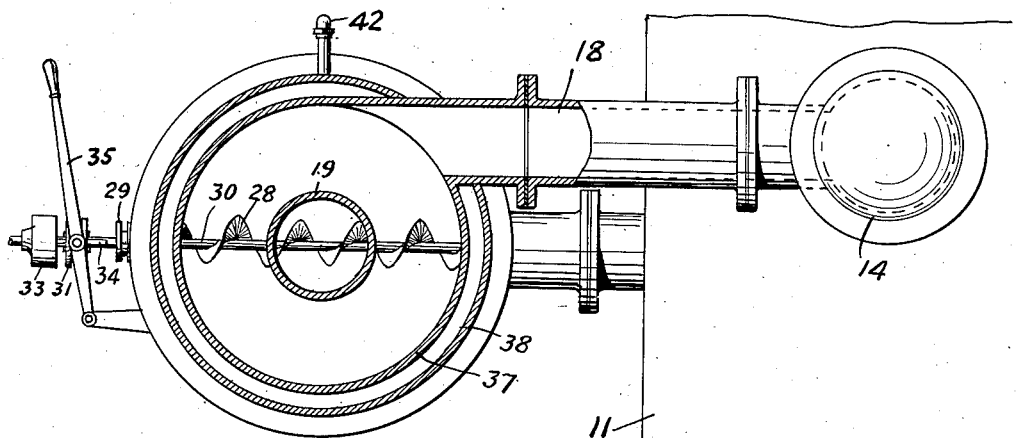
Fig. 3 is an end view from the left side of Fig. 1, with parts in vertical cross-section.
Figure 2:
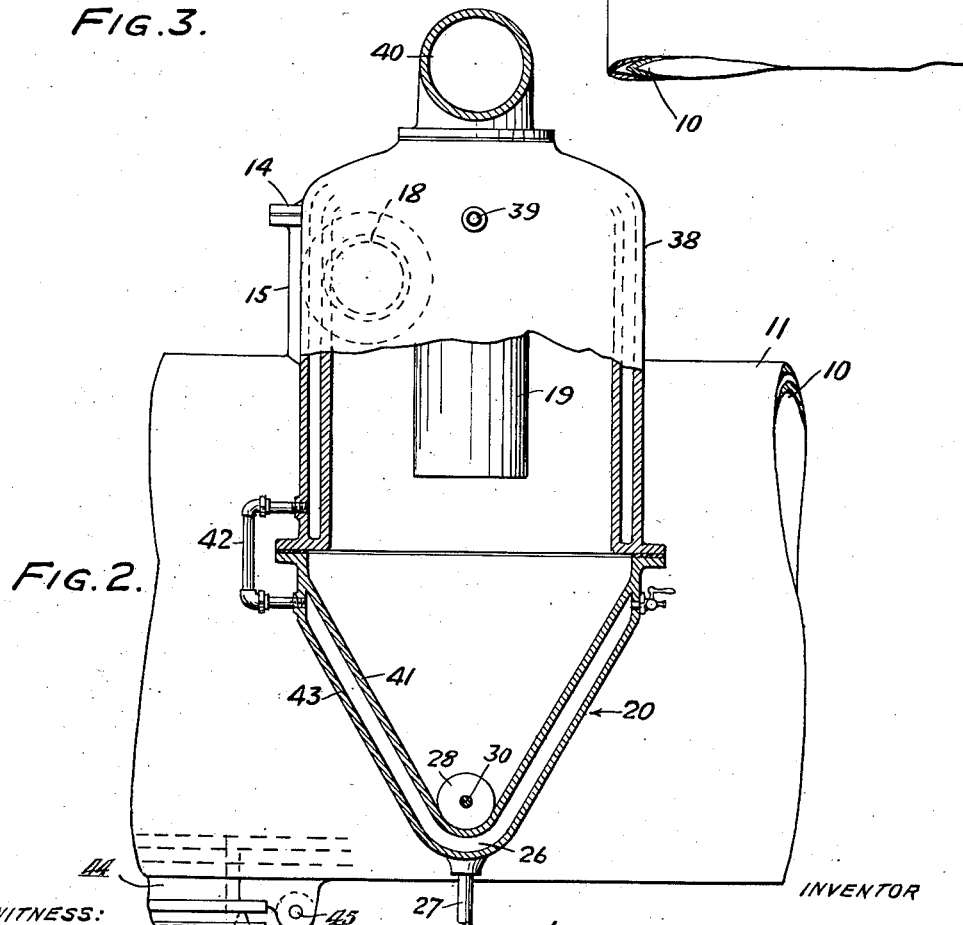
Fig. 2 is a top plan view, with parts in horizontal cross-section.

Referring to the drawings: A rotary vacuum drier of standard construction is shown in cross-section in Fig. 1 at 10, having a rotating shaft 17 on which the agitating paddles 16 are fastened. The vacuum chamber is provided with a jacket 11 for applying steam or other heating means, with inlet connections at 12 and outlet connections at 13. The material to be dried is dumped in through feed pipe 15 by removing the cover 14. The finished and dried material is discharged through one or more openings like the discharge opening 44 which, during the drying operation, is kept closed by means of a cover 47 provided with a gasket 46 and hinged at 45, the cover being clamped in place at the opposite side of hinge 45. The centrifugal dust-trap as shown here consists of a drum 37, forming an annular space around the exhaust connection or exit duct 19. The drum 37 is provided with a jacket 38 for steam or other heating means with inlet connections at some point like 39. Near the top or dome of drum 37 the annular space is connected by means of a suitable size duct 18 to the intake 15 of the vacuum chamber 10. Thus, in this case, pipe 15 also serves as the exhaust connection from the interior of the drier. The exhaust duct 18 is connected to the side of the drum, Fig. 3, so that the vapors enter the annular space in a tangential direction and are given a rapid rotary swirling motion, throwing the dust towards the periphery of the annular space. As the heavy dust particles are thrown out by the centrifugal action and drop down into the receiver below, the practically dust-free vapors turn up into the exit duct 19 and pass out through the connection 40. The sharp turn which the vapors must make around the bottom end of exit duct 19 in passing out also is a definite aid in the separation. The exit duct 19 is usually placed in the center of drum 37 and extends well down towards the bottom of the drum. This duct may be of the same size or smaller than the communicating duct 18, but it is sometimes desirable to make it of larger area so as to reduce the velocity of the vapors as they pass on through 40 to the condenser and/or the auxiliary filters.

Under drum 37 is provided the dust-receiving receptacle 20, which may be a conical or a wedge-shaped trough, jacketed all around or only along the sloping sides 41, Fig. 3, as shown at 43 and 26. Steam connections may be provided for, as shown at 42, with outlet at 27. The sides of receiver 20 slope steeply down to a suitable conveyor such as a rotating screw 28.

The screw conveyor 28 extends through duct 21 nearly to the inside wall of the drier. It is rotated by means of a shaft 30 extending out through a stuffing-box or sealed bearing 29 in the side of the receiver 20. On shaft 30 is a collar 31 which is fastened against rotary axial movement relative to shaft 30 and which is slidably connected to the prime mover P through some such means as a collar 33 provided with pins 34 extending through clearance holes in 31, so that collar 31, shaft 30 and screw 28 may be moved endwise by means of a shifter-lever 35 without stopping the rotation of the screw 28. Another feature, which may or may not be used, but which I have found to be of decided advantage, is that the screw 28 is made with two differing pitches of the conveyor flights or spirals. The part of the screw 28 which is in the receiver has the flights spaced with a large pitch so as to collect a large amount of powder, while the portion 22 in the duct 21 has the flights spaced at a smaller pitch. This construction has a tendency to decrease the speed and compress the powder as it is forced through the smaller pitch of the screw and form a comparatively solid plug of powder at 23 between the end of the screw and the inside of the vacuum chamber, thus providing an effective vacuum and vapor seal in duct 21.

In forcing the plug 23 against the weight of the material in the drying chamber 10, it may become so hard and tight in duct 21 that the powder in the screw does not have sufficient traction to push the plug on into the drying chamber. By moving the screw 28 endwise, as provided for and described above, the plug is loosened and driven on. As the screw slips back to its normal position, the pressure against the looser powder in the receiver is released and it will start to flow again.

Some powders may have a tendency to cling to the screw flights and form a solid bar rotating with the screw, thus preventing any endwise motion of the compressed powder. To overcome this difficulty, I provide spiral ribs 24 in part of duct 21 which prevents the compressed powder from rotating with the screw and acts to keep it moving in the desired direction.

Instead of relying on the accumulation of the dust particles in duct 21 to form a vacuum and/or vapor seal, it is obvious that a valve may be interposed in duct 21 without departing from the principle of the invention. The methods and means described here, however, are simpler and considerably more efficient than any mechanical valves that may be used in this connection.

As stated above, a considerable amount of dust particles are carried out by the vapor current through duct 18 into the annular space of drum 37 where, by the centrifugal action, the heavier dust particles separate out and fall into the receiver, accumulating around the conveyor 28 and, being picked up by it, are carried back while being compressed into the drying chamber 10. This rotation of the powder continues until the drying process is completed.

The jacket around the drum and the receiver are provided so as to prevent condensation of vapors which might otherwise form a sticky mass of the dust.

The principles of vacuum drying may be briefly defined as follows:

Removing a certain amount of moisture from damp material by placing the material in a closed chamber, rarefying the atmosphere within the chamber by producing and maintaining a suitable vacuum on the system, applying heat at suitable temperature to the material within the chamber so as to keep this at the vacuum-boiling temperature of the moisture, and providing means for segregating the fluid (vapors) thus liberated from the material.

The boiling point or the temperature at which the fluid or vapors pass out will, of course, vary with the height of the vacuum and the nature of the moisture being vaporized.

While I have shown only one embodiment of my invention and only in connection with a standard rotary vacuum drier of the type in which the cylindrical shell is stationary and the contents agitated by a revolving set of agitator paddles and blades, it should be understood that the centrifugal dust-trap and collector through minor modifications may be used equally as effectively with other types of driers, as, for example, driers in which the whole vacuum chamber revolves.

I do not intend to be limited save as the scope of the prior art and of the attached claims may require.

I claim:—

1. An apparatus for drying powdered material comprising, a vacuum drier having means for agitating material in said drier, a vacuum producing device for removing fluid from said drier, a separator for separating fluid from material carried by the fluid and connected between said drier and said device, said separator having an inlet from said drier tangential to the inner wall of said separator and having an outlet therein spaced from the sides and from the bottom of said separator and beneath said inlet, and a conveyor leading from the lower part of said separator to said drier for returning material from said separator to said drier, said conveyor having mechanical means adjacent the inlet to said drier for compressing material on said conveyor to form a seal against the escape of fluid or vacuum through the inlet from said conveyor to said drier.

2. An apparatus for drying powdered material comprising, a vacuum drier having means for agitating material in said drier, a vacuum producing device for removing fluid from said drier, a separator for separating fluid from material carried by the fluid and connected between said drier and said device, said separator having an inlet from said drier tangential to the inner wall of said separator and having an outlet therein spaced from the sides and from the bottom of said separator and beneath said inlet, and a conveyor leading from the lower part of said separator to said drier for returning material from said separator to said drier, said conveyor having a spiral thereon, at least a portion of said spiral being in said separator, and having a second spiral thereon of smaller pitch than said first-mentioned spiral and being located in the inlet from said conveyor to said drier so as to compress material on said conveyor to form a seal against the escape of fluid and vacuum through the inlet from said conveyor to said drier.

3. An apparatus for drying powdered material comprising, a vacuum drier having means for agitating material in said drier, a vacuum producing device for removing fluid from said drier, a separator for separating fluid from material carried by the fluid and connected between said drier and said device, said separator having an inlet from said drier tangential to the inner wall of said separator and having an outlet therein spaced from the sides and from the bottom of said separator and beneath said inlet, a conveyor leading from the lower part of said separator to said drier for returning material from said separator to said drier, said conveyor having mechanical means adjacent the inlet to said drier for compressing material on said conveyor to form a seal against the escape of fluid or vacuum through the inlet from said conveyor to said drier, and second mechanical means co-operating with said mechanical means on said conveyor to cause the compressed material to be moved by said conveyor.

4. An apparatus for drying powdered material comprising, a vacuum drier having means for agitating material in said drier, a vacuum producing device for removing fluid from said drier, a separator for separating fluid from material carried by the fluid and connected between said drier and said device, said separator having an inlet from said drier tangential to the inner wall of said separator and having an outlet therein spaced from the sides and from the bottom of said separator and beneath said inlet, a conveyor leading from the lower part of said separator to said drier for returning material from said separator to said drier, said conveyor having a spiral thereon, at least a portion of said spiral being in said separator, and having a second spiral thereon of smaller pitch than said first-mentioned spiral and being located in the inlet from said conveyor to said drier so as to compress material on said conveyor to form a seal against the escape of fluid and vacuum through the inlet from said conveyor to said drier, and spiral ribs spiraling in the opposite direction to and spaced opposite the edges of said second spiral on said conveyor and co-operating with said second spiral on said conveyor to cause the compressed material to be moved by said conveyor.

5. An apparatus for drying powdered material comprising, a vacuum drier having means for agitating material in said drier, a vacuum producing device for removing fluid from said drier, a separator for separating fluid from material carried by the fluid and connected between said drier and said device, said separator having an inlet from said drier tangential to the inner wall of said separator and having an outlet therein spaced from the sides and from the bottom of said separator and beneath said inlet, a conveyor leading from the lower part of said separator to said drier for returning material from said separator to said drier, and a support for said conveyor providing for movement of said conveyor relative to said drier in addition to the conveying motion of said conveyor whereby material plugged in the inlet from said conveyor to said drier can be dislodged.

6. Apparatus for drying powdered material comprising, a vacuum drier for containing the material to be dried, a vacuum-producing means for removing fluid from the material in said drier and for incidentally removing material which is entrained by said fluid, means for separating said entrained material from said fluid interposed between said drier and said vacuum-producing means, a conduit from said last-mentioned means to said drier, and a conveyor in said conduit for receiving material from said last-mentioned means and for returning said material to said drier and for compressing said material against said conduit at the point of return of said material to said drier to prevent the escape of fluid at this point.

7. A process of drying powdered material, which process comprises, beating and agitating powdered material to be dried, simultaneously applying to said material heat and sub-atmospheric pressure to such an extent so to extract fluid and material entrained by said fluid from said material, separating said fluid and material entrained by said fluid by conducting said fluid and said material entrained by said fluid along curved paths of such sharp curvature that centrifugal force causes particles of material entrained by said fluid to part from the particles of fluid entraining them, returning separated particles of material which has been entrained by said fluid to said beating and agitating, and condensing the separated particles together as they are returned to the beating and agitating to prevent escape of fluid at this point.

LAWRENCE H. BAILEY.